April 30, 1929.　　　C. SKLAREK　　　1,711,129
DIRIGIBLY MOUNTED LIGHT
Filed Feb. 18, 1924
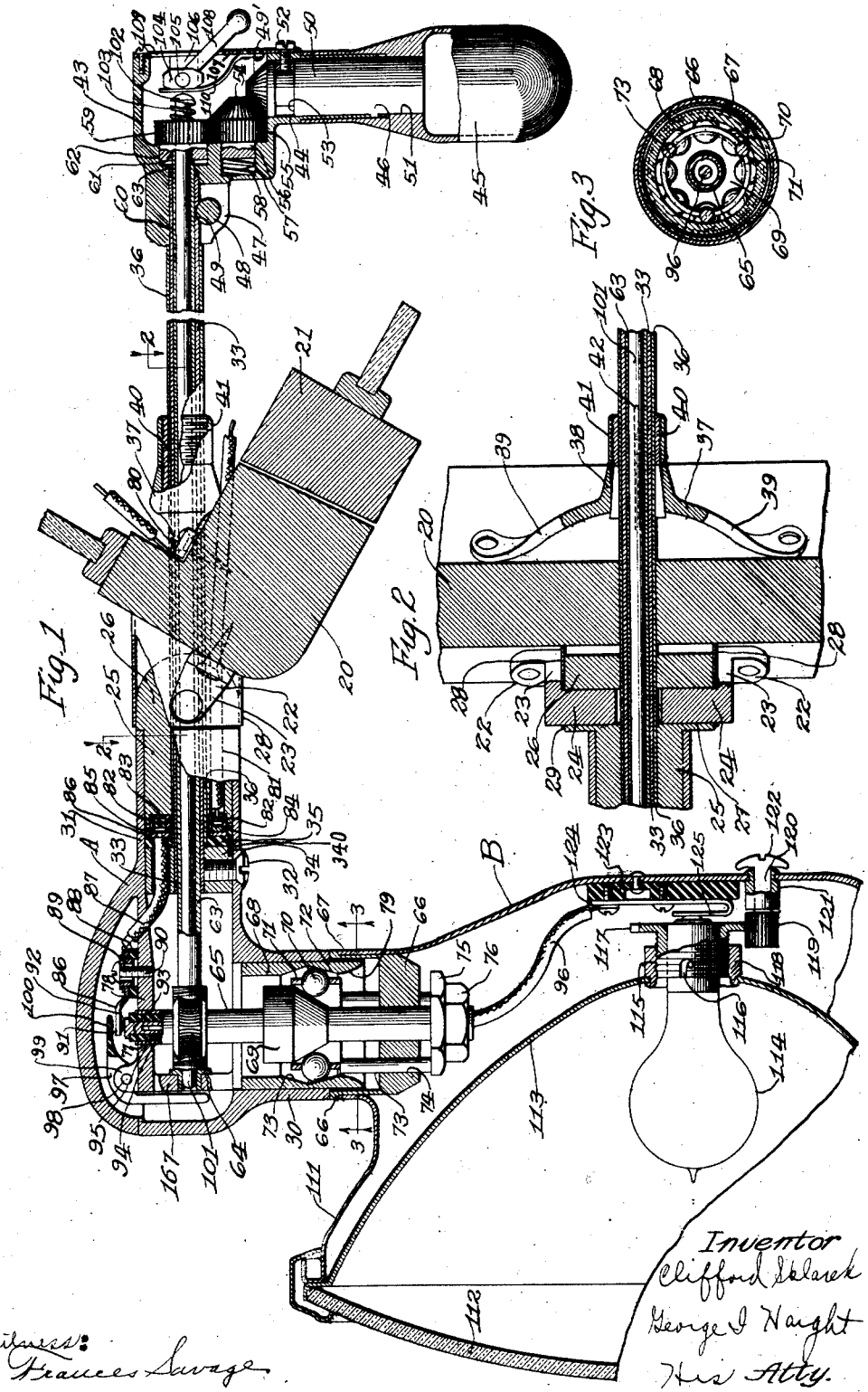
Inventor
Clifford Sklarek
George I. Naight
His Atty.
Witness:
Frances Savage Patented Apr. 30, 1929.

1,711,129

UNITED STATES PATENT OFFICE.

CLIFFORD SKLAREK, OF CHICAGO, ILLINOIS, ASSIGNOR TO INTERNATIONAL SPOT-LIGHT CORPORATION, A CORPORATION OF ILLINOIS.

DIRIGIBLY-MOUNTED LIGHT.

Application filed February 18, 1924. Serial No. 693,410.

This invention relates to improvements in dirigibly mounted lights.

One object of the invention is to provide a light, more particularly a spot light for automobiles and other vehicles, which is universally adjustable by simple and readily operated means requiring the use of only one hand of the operator and a single operating element.
Another object of the invention is to provide a light of the character indicated, wherein universal means is provided for attaching the same to the super-structure of the automobile so that the mounting may be disposed at any desired angle.

A further object of the invention is to provide an adjustably mounted electric light, wherein is employed an electric switch of simple construction, the operating means of which is so located as to be readily accessible and easily operated and within reach of the hand of the operator which is engaged with the operating element.

A still further object of the invention is to provide a light of the character indicated, wherein a simple and efficient adjusting means for focusing the lamp bulb is provided.

Another object of the invention is to provide an adjustably mounted spot light having a rotatable lamp head supported by an adjustable anti-friction bearing mounting which entirely supports the head.

Other objects and advantages of the invention will more clearly appear from the description and claims hereinafter following.

In the drawing forming a part of this specification, Figure 1 is a horizontal, sectional view taken through the corner post of a closed type of automobile super-structure and showing my improvements in horizontal section in connection therewith, portions being broken away to more readily accommodate the view to the sheet of the drawing. Figure 2 is a vertical, longitudinal sectional view on an enlarged scale, partly broken away, corresponding substantially to the line 2—2 of Figure 1. And Figure 3 is a transverse, sectional view on an enlarged scale, corresponding substantaially to the line 3—3 of Figure 1.

In said drawing, 20 designates the corner post of the super-structure of a closed type of automobile to which my improved spot light is adapted to be attached. A portion of the side door of the automobile is indicated at 21. Although my improved spot light may be applied to wind shields of open cars, in this instance it is illustrated as applied to a closed car, the same being primarily designed for the latter use and readily accessible for operation from the interior of the car at a point convenient to the driver and in proximity to the usual steering wheel.

In carrying out my invention, I employ a pair of suitable brackets 22—22 which are secured to the outer side of the corner post 20 by screws or any other suitable fastening devices. Each bracket 22 is provided with an outstanding, horizontally disposed arm 23 extending at right angles from one end of the base portion thereof. At the outer end of the arm, extending at right angles thereto and formed integral therewith, is a vertically disposed trunnion 24. The brackets 22 are reversely arranged, being disposed in spaced relation with the trunnions 24 thereof in alinement and extending toward each other. Supported by the brackets 22 is a tubular bearing sleeve 25 as clearly shown in Figures 1 and 2, the bearing sleeve being enlarged at the inner end as indicated at 26, providing a head of rectangular cross-section having a vertically disposed opening adapted to receive the trunnions 24. It will be evident that the sleeve 25 is thus pivotally mounted for movement horizontally so that the same may be adjusted to any desired angle with reference to the brackets 22 and the corner post 20. To provide sufficient clearance to permit the horizontal pivotal movement of the sleeve, the inner end of the head is preferably cut away on a curve concentric with the opening 27 as clearly shown in Figure 1. The head 26 is enclosed by a relatively short sleeve 28 corresponding in section to the rectangular cross-section of the former and snugly fitting the same. The inner end of the sleeve abuts the outer surface of the post 20 and is cut away at an angle to properly fit the same. When the parts are assembled, the sleeve 28 is held in fixed position by the trunnions 24 which extend through alined openings 29 at the top and bottom of the sleeve registering with the opening 27.

Rotatably mounted with respect to the bearing sleeve 25 and the support formed by the brackets 22 is what may be termed generally, a housing A carrying a lamp head or shell B, bodily rotatable therewith and also at right angles thereto. Said housing A, as shown, preferably consists of a casting having a main, vertically extending, generally cylindrical section 30 from which is extended laterally a cylindrical tubular sleeve 31, the latter being disposed co-axially with reference to the bearing sleeve 25 and journaled thereon. Extending into and rigidly secured to the sleeve 31, as by a screw 32, or any other suitable means, is a hollow operating arm 33, a spacing sleeve 34 through which the set screw 32 extends, being interposed between the arm and the interior surface of the sleeve 31. As clearly shown in Figure 1, the collar 34 is spaced from the outer free end of the bearing sleeve 25, a relatively thick collar 35 of insulating material being interposed, the latter being normally slightly spaced from the free end of the bearing sleeve, as clearly shown in the drawing, and fixed to the collar 34 by a key 340 for rotation in unison therewith.

The operating arm 33 is housed within a snugly fitting tubular casing 36, the front portion of which is telescoped within the bearing sleeve 25 protruding beyond the front end of the latter and extending through the collar 35 and terminating flush with the outer side of the latter. The casing 36 passes through the post 20 and is supported by a bracket 37 secured to the inner side of the post.

The bracket 37 comprises a hollow hub-like portion 38 through which the casing 36 extends, and a pair of oppositely extending, vertically disposed supporting arms 39 formed integral with the front end of the hub and having their free ends secured to the post by means of screws or any other suitable fastening devices. The bracket 37 is preferably formed of bendable metal so that the arms 39 may be readily bent or twisted without any danger of breakage, to properly fit the bracket to the post 20. The casing 36 is tightly clamped to the bracket 37 by an externally threaded, split conical sleeve 40, disposed within the opening of the hub and surrounding the casing, the opening in the hub being rearwardly tapered, as shown, to force the sleeve to contract when moved rearwardly relatively to the hub. The sleeve 40 is appreciably longer than the hub and has the threaded portion thereof protruding rearwardly of the hub. An internally threaded, knurled collar 41, adapted to abut the rear end of the hub 38, is screwed onto the sleeve 40, drawing the same inwardly, rearwardly of the hub to contract the sleeve to tightly clamp the casing to the bracket 37. The sleeve 40 is preferably splined on the casing 36 by means of a key 42, thereby permitting longitudinal movement thereof relatively to the casing while preventing relative rotation. The supporting means formed by the bracket 37 provides for adjustment of the casing at various angles with respect to the post 20 due to the bendable nature of the arms 39.

To operate the spot light with the utmost convenience, I provide means manipulated by one hand of the operator to effect both the operation of the mechanism for producing bodily swinging movement of the lamp head with the operating arm 33, and the mechanism for producing independent rotation of the lamp head at right angles thereto. The mechanism for rotating the arm 33 includes a casting 43 in the form of a housing rigidly secured to the operating arm 33 and provided with a laterally extending, cylindrical sleeve 44 formed integral therewith, the latter being disposed near the rear end of the housing. An operating hand grip 45 is secured to the housing, the same being provided with an axial bore 46, adapted to receive the cylindrical sleeve 44, the hand grip being rotatably mounted on the sleeve for a purpose hereinafter described.

The housing 43 is provided with a bore 60, coaxial with the casing 36, adapted to receive the rear end portion of the operating arm 33. As clearly shown in Figure 1, the rear end of the casing 36 normally abuts the housing 43 and the arm 33 protrudes beyond the end of the casing. At the front end, the housing is split as indicated at 47. A clamping screw 48 extending through the split portion of the housing and engaging a shallow recess 49 in the arm 33 serves to draw the split portion together and tightly clamp the housing to the arm, the screw coacting with the recessed portion to assist in preventing relative rotation of the parts. It will be evident that, upon swinging the hand grip in either a right or left-hand direction, the arm 33 will be rotated therewith, effecting a corresponding swinging movement of the lamp head B with the casing A which is rigidly secured to the arm 33 as hereinbefore described.

The mechanism for effecting rotation of the lamp head at right angles to the axis of rotation of the housing A is also operated through the manipulation of the hand grip 45, by rotating the latter about the longitudinal axis of the sleeve 44. The mechanism for rotating the lamp head B at right angles to the direction of rotation of the housing A includes a beveled gear 49' provided with a stem 50 rotatably mounted in the bore of the sleeve 44, the lower end of the stem being rigidly secured to the hand grip in any suitable manner so that the gear is positively rotated thereby. The stem 50 is preferably secured to the hand grip by a driving fit within a reduced portion 51 of the bore 46. To rotatably retain the gear 49' and the hand grip 45 in assembled relation with the housing 43, a set screw 52 extending through the lower end of the housing and its inner end engaged in an annular groove 53 near the upper end of the stem 50.

The beveled gear 49' meshes with a second beveled gear 54 formed integral with a spur gear 55 having a hub portion 56 journaled in a bearing opening 57 formed in the housing immediately below the bore 60. A coiled spring 58 is interposed between the inner end of the hub 56 and the bottom of the opening 57 to force the beveled gear 54 into close engagement with the gear 49' to prevent looseness and avoid rattling of the parts. The spur gear 55 meshes with a second spur gear 59 provided with a hollow hub 61 rotatably mounted in an enlarged portion 62 of the bore 60 of the housing. The opening of the hub 61 is preferably of rectangular cross-section and the gear 59 is rigidly secured to a relatively long, hollow operating shaft 63, having the rear end thereof of square cross-section and received within the square opening of the gear 59.

The operating shaft 63 extends axially through the arm 33 and is rotatably mounted therein, the arm 33 serving as a bearing for the same. The front end portion of the shaft 63, as clearly shown in Figure 1, extends beyond the corresponding end of the arm 33 and into the cylindrical section of the housing A, and has a worm rigidly secured thereto, meshed with a worm gear 64 rigidly secured to a hollow stub shaft 65 having its lower end rigid with a thimble like sleeve 66, tightly fixed in the upward extension 67 of the lamp head B. The outer end of the shaft 63 is journaled in a vertically disposed wall 167, preferably formed integral with the housing A and spaced inwardly from the front end of the latter.

The stub shaft 65 is rotatably supported in the cylindrical section 30 of the housing by an adjustable bearing comprising, a bearing sleeve 68 tightly fitting the interior of the section 30, a bearing cone 69 rigid with the shaft 65 and preferably formed integral therewith, and a plurality of ball bearings 70 interposed between the sleeve and cone and carried in a ball retaining ring 71. To resist wear, both the sleeve 68 and the cone 69 are preferably formed of steel. The sleeve 68 is formed with a ball raceway having a downwardly tapering wall 72, the degree of taper of the wall 72 being less than that of the cone 69, so that the ball bearings 70 will be wedged between the cone 69 and the sleeve 68 when the ring 71 carrying the same is forced upwardly to take up for wear. Above the wall 72, the interior of the sleeve is preferably cut away as indicated at 73 to provide ample clearance for the ball bearings and retaining ring to permit adjustment upwardly relatively to the sleeve 68. The mouth of the sleeve at the lower end is flared outwardly as indicated at 79, for a purpose hereinafter described. The ring 71 is supported by a plurality of vertically disposed, adjustable push rods 73' circularly arranged about the shaft 65 and slidably movable within vertical bores 74 in the bottom wall of the thimble 66. The lower ends of the push rods 73' protrude beyond the thimble and are supported by a collar or nut 75 screwed onto the protruding lower end of the stub shaft 65. The parts are so proportioned that the upper side of the nut is normally spaced from the lower end of the thimble 66 to permit adjustment of the nut on the shaft 65 to lift the rods 73' and force the ring 71 upwardly thereby adjusting the ball bearings to compensate for wear as hereinafter pointed out. A lock nut 76 also screwed onto shaft 65 serves to prevent accidental movement of the nut 75. It will be evident that, when the parts are assembled, the shaft and the lamp head B carried thereby are supported entirely by the ball bearing arrangement just described, the upper end of the thimble being held snugly engaged with the lower end of the section 30. The upper end of the shaft 65 is rotatably mounted in a bearing opening 77 in a horizontal partition 78, the shaft 65 being free to slide in the opening 77 so that the same may be readily entered therein when the parts are being assembled. It will be evident that the ball bearing may be finely adjusted by the described means to prevent rattling of the parts and also provide resistance to rotary movement of the head B to prevent the latter from being thrown accidentally out of adjusted position by jarring or to prevent over-rotation of the same. In assembling the lamp head B with the housing A, the rods are first withdrawn from the thimble to an extent to permit the ball carrying ring 71 to rest on the inner surface of the bottom wall of the thimble 66. The lamp head is then placed in position by passing the shaft 65 into the section 30 and entering its upper end in the opening 77. The ring 71 is then pushed upwardly by adjusting the rods 73'. As the ring is moved upwardly, the ball bearing 70 will be guided and forced toward the axis of the shaft 65 by engagement with the outwardly flaring wall 79 of the sleeve. The adjustment of the ring is continued until the balls are brought into engagement with the cone and forced outwardly into contact with the wall 72.

In making the electric circuit, I preferably employ the so called "grounded system", the source of electric energy being derived from the usual storage battery found on automobiles. From the battery are led two insulated wires up to the spot light. The end of the negative wire is preferably soldered or otherwise secured to the metal bracket 38 as indicated at 80, being herein shown as clamped beneath the head of the screw by which one of the arms 39 is secured. The positive wire is led through a bore 81 extending longitudinally of the bearing sleeve 25 and to one side of the axis thereof, the end of the positive wire being electrically connected to a spring commutator or contact ring 82 mounted in an annular groove 83 of a ring of insulating material 84 fitted within an annular groove in the outer end of the bearing sleeve 25. A contact ring 85 fixed in an annular groove of the collar 35 of insulating material coacts with the ring 82, being yieldingly engaged by the projecting portion of the latter. The ring 85 is electrically connected to a bowed contact spring 86 by means of a short insulated wire 87 led through openings in the partition 78 and the collar 34. The spring arm 86 forms a part of a switch, one end of said arm being clamped between a ring 88 of insulating material and the annular flange of a sleeve like washer 89 extending through the spring and held by a screw 90. The end of the wire 87 is preferably provided with a terminal lug of well known form, which is clamped between the flange of the collar and the spring 86.

The spring 86 is angularly bent upwardly, the end portion 91 thereof being horizontally disposed and provided with a contact projection 92 adapted to coact with the upper face of a contact member 93 arranged within the upper end of the bore 94 of the shaft 65 and insulated therefrom by an interposed sleeve 95. The contact member 93 is electrically connected with one end of an insulated wire 96 extending through the axial bore 94 of the stub shaft and leading to the lamp proper 114 mounted in the lamp head.

The spring arm 86 of the switch is adapted to be operated, to open and close the circuit, by an L-shaped lever 97 pivotally supported from the partition 78, the same being mounted on a pivot 98 having its opposite ends fixed in a pair of upstanding lugs 99 at the front end of the partition. The upper arm of the lever 97 is substantially horizontally disposed and has a tip of insulating material 100 coacting with the horizontal portion of the spring 86, secured thereto in any suitable manner. The other arm of the L-shaped lever 97, which is vertically disposed, extends in front of the wall 167 and the lower end thereof is adapted to coact with a push rod 101 extending axially through the bore of the split shaft 63 and slidably movable therein. The rear end of the push rod 101 protrudes beyond the gear 59 and is provided with a head 102. A helical spring 103 surrounding the end of the push rod and interposed between the head 102 thereof and the outer end face of the gear 59 serves to yieldingly retain the rear end of the rod projected, as clearly shown in Figure 1. As will be evident, upon reciprocation of the rod 101, the L-shaped lever 97 will be oscillated thereby operating the arm 86 to make and break the circuit, the lever depressing the arm to complete the circuit when the push rod 101 is moved forwardly.

The push rod 101 is adapted to be reciprocated by an oblong cam block 104 rotatably mounted on a pin 105 secured in a lug 106, said lug being formed integral with and protruding inwardly from a detachable plate 107 forming the end wall of the housing 43. A lever arm 108 formed integral with the cam block 104 and extending through a vertical slot 109 in the plate 107 serves as a finger piece for operating the cam. To retain the cam block 104 in either of its extreme positions of movement, the same is provided with flat end and side faces adapted to coact with a bowed leaf spring 110 fixed at its lower end to the plate 107, by rivets or any other suitable form of securing means. When the finger piece 108 is in the depressed position shown in Figure 1, the circuit is open, the rod 101 being held in its retracted position by the spring 103 and the horizontal arm of the L-shaped lever 97 being in the elevated position shown, thereby permitting the spring arm 86 to remain out of contact with the block 93. To close the circuit, the finger piece 108 is moved upwardly turning the cam block through an arc of 90°. As the cam block is turned, the rod 101 will be projected, swinging the lever 97, moving the tip 100 into contact with the spring arm 86 and pressing the latter against the plug 93. It will be evident that the flat spring 110 engaging the free end of the cam block retains the same in position, thereby maintaining the circuit closed. When the finger piece is again swung downwardly to the position shown in Figure 1, the push rod 101 will be free to move rearwardly and will be forced again to the position shown in Figure 1, permitting free movement of the L-shaped lever 97, whereupon the spring arm 86, due to its resilience, returns to original position, thereby breaking the circuit.

As will be evident, the finger piece provides a very convenient means for opening and closing the circuit, the operator being able to manipulate the same by one of his fingers or thumb of the same hand engaging the hand grip 45 without removing his hand from the latter.

The lamp head B comprises a shell 111 of suitable construction, the shell carrying the usual lens 112 and reflector mirror 113 together with the electric lamp bulb proper indicated at 114. The electric lamp bulb is mounted for adjustment with respect to the reflector 113 so as to obtain proper focusing of the light, this being accomplished by the following means: The lamp bulb 114 is mounted in an externally threaded socket member 115 provided with the usual bayonet slots 116 coacting with the usual pins on the bulb for holding the same within the socket. The socket member 115 has an annular flange at the rear end thereof provided with peripheral teeth, thereby providing an integral spur gear member 117. The socket 115 is screwed into an internally threaded sleeve 118 rigidly secured to the reflector 113 in any suitable manner. It will be noted that upon rotation of the sleeve in the proper direction, the same will be screwed inwardly or outwardly with reference to the sleeve 115, thereby adjusting the lamp bulb relatively to the reflector. The spur gear 117 meshes with an elongated spur gear 119 fixed to a short shaft 120 journaled in a sleeve 121 rigidly secured within an opening in the rear wall of the shell 111. The shaft 120 is provided with an integral, slotted screw head 122 for rotating the same. Upon rotation of the shaft 120 by means of a screw driver, the gear 117 will be rotated through the gear 119, effecting rotation of the socket 115, screwing the same inwardly or outwardly of the sleeve 118, thereby effecting adjustment of the lamp bulb.

A block of insulating material 123 is riveted to the rear wall of the head B, carrying a contact spring member 124 secured thereon by screws or any other suitable means. The free end of the spring 124 is reversely bent as indicated at 125 and has its free end bearing on the contact point of the lamp bulb 114. The opposite end of the spring 124 is electrically connected to the wire 96 leading from the plug 93. The bowed arm of the spring 124 which yieldingly bears on the end of the bulb maintains electric contact therewith while the same is adjusted inwardly and outwardly and also holds the pins on the bulb in yielding engagement with the short ends of the bayonet slots of the socket 115.

In the manufacture, shipping and assembling of my improved device, I prefer to adopt the following procedure, the casing A, the arm 33, the hollow shaft 63, the sleeve 36 and all other parts to the left of the post 20 as viewed in Figure 1 will be assembled as one unit and so shipped. In assembling the device, it is only necessary to bore a hole through the post 20, whereupon the said unit may be assembled with the post and the brackets 22 secured in place by the screws provided for that purpose. Next, the bracket 37 with the sleeve 40 therein is slipped over the casing 36 and secured to the post by means of screws provided for that purpose, the arms 39 being first bent to fit the post. The nut 41 is then screwed home, clamping the casing 36 securely to the bracket 37. The handle supporting casting or housing 43 is assembled, shipped and applied as a unit, the same carrying the operating lever 108, the cam block 104, the spring arm 110, the hand grip 45, the gears 49′, 54 and 59 and the push rod 101 having the spring 103 thereon, so that, when the rod 101 is telescoped within the shaft 63 and the housing slipped over the extended end of the arm 33, the gear 59 will make non-rotatable connection with the square end portion of the hollow shaft 63. The casting 43 is then tightly clamped to the operating arm 33 by tightening the screw 48. By adopting this procedure, it is evident that the device may be applied to a car without the aid of skilled labor, the only tools needed being a screw driver and the means for drilling the necessary hole through the post.

I have herein shown and described what I now consider the preferred manner of carrying out my invention but the same is merely illustrative and I contemplate all changes and modifications that come within the scope of the claims appended hereto.

I claim:

1. In a dirigible light, the combination with a relatively fixed supporting means; of a light carrier rotatably supported by said means, said carrier including a lamp head and a housing supporting said head, said lamp head extending to one side of said housing; mechanism for effecting rotation of said head and housing about axes at an angle to each other, including a single operating handle; an electric circuit; a switch within said housing in line with said head; and operating means for said switch, including a movable finger piece mounted adjacent said handle.

2. In a dirigible light, the combination with a relatively fixed supporting means; of a shaft rotatably mounted on said means to turn about one axis; a light carrying member rotatably supported from the outer end of said shaft to turn about a different axis; means for effecting independent rotation of said shaft and member about their respective axes, said means including a hand grip; an electric switch at the said outer end of said shaft, actuating means for said switch, including a push rod operated lever mechanism, said push rod extending through said shaft; and means adjacent the handle coacting with said push rod to actuate the same.

3. In a dirigible light, the combination with relatively fixed supporting means; of a shaft rotatably mounted on said means to turn about one axis; a light carrying member rotatably supported from the outer end of said shaft to turn about a different axis; means for effecting independent rotation of said shaft and member about their respective axes, said means including a hand grip; an electric circuit; a switch at said outer end of the shaft; and actuating means for said switch including a push rod extending through the shaft and a lever operated cam adjacent said handle.

4. In a dirigible light, the combination with relatively fixed supporting means; of a shaft rotatably mounted on said means to turn about one axis; a light carrying member rotatably supported from the outer end of said shaft to turn about a different axis; means for effecting independent rotation of said shaft and member about their respective axes, said means including a hand grip at the opposite end of said shaft; an electric circuit; a switch at said outer end of the shaft including an angular lever; and actuating means for said switch including a finger piece movably mounted adjacent the handle end of the shaft.

5. In a dirigible light, the combination with a relatively fixed supporting means; of a shaft rotatably mounted on said means to turn about one axis; a light carrying member rotatably supported from said shaft to turn about a different axis; means for effecting independent rotation of said shaft and member about their respective axis, said means including a handle support rigid with said shaft, a handle rotatably mounted on said support and operative connections between the light carrying member and handle, said connections including a train of gears, one of said gears being fixed to the handle for rotation therewith and another of said gears being fixed to said shaft and rotatable therewith, and a third gear disposed at an angle to said first named gear and in engagement with the latter and said second named gear, said third gear being rotatably mounted in the handle support and yieldingly held engaged with said first named gear.

6. In a dirigible light, the combination with a relatively fixed supporting means; of a shaft rotatably mounted on said means to turn about one axis; a light carrying member rotatably supported from said shaft to turn about a different axis; means for effecting independent rotation of said shaft and member about their respective axes, said means including a handle support rigid with said shaft, and a handle rotatably mounted on said support; an electric circuit; a switch; and means for operating said switch including a spring pressed rod slidable in said shaft; and a lever operated cam on said handle support coacting with said rod.

7. In a dirigible light, the combination with relatively fixed supporting means; of a carrier rotatably mounted on said means to turn about one axis; a lamp head rotatably supported from said shaft to turn about a different axis; and means for effecting rotation of said carrier and head about their respective axes, said means including, a handle support rigid with said carrier, a handle rotatably mounted on said support, a driving shaft for said head, said shaft being rotatably mounted in said carrier, and a train of gears for driving said shaft from the handle, said train of gears including a pair of gears fixed to said shaft and handle respectively, and an intermediate gear member having teeth meshed with said first named gears respectively, said intermediate gear member being spring pressed against said gear fixed to the handle.

8. In a dirigible light, the combination with relatively fixed supporting means having a tubular bearing portion; of a tubular carrier mounted on said bearing portion for rotation about its longitudinal axis; a light carrying member rotatably supported from said carrier and extending to one side thereof to turn about a different axis and having a conductor extending along the same; means for effecting independent rotation of said carrier and member about their respective axes; an electric circuit including contact rings disposed in engagement with each other, said rings being fixed respectively to said supporting means and carrier; and a switch mounted adjacent to said light carrying member and adapted to make and break the circuit between said conductor and one of said rings.

9. In a dirigible light, the combination with a support; of a tubular member extending through said support; a mounting for said tubular member, said mounting including a bracket provided with a socket; a split conical sleeve disposed within said socket and adapted to receive said tubular member, said sleeve projecting from said socket; and means secured to said sleeve and adapted to abut against said bracket for moving said sleeve with reference to said bracket to wedge said tubular member in the socket of said bracket.

10. In a dirigible light, the combination with a support; of a tubular member extending through said support; and brackets mounted at opposite sides of said support, one of said brackets being provided with trunnions for pivotally supporting said tubular member at one side of said support and the other bracket being formable to accommodate the same to the configuration of said support at the opposite side thereof.

11. In a dirigible light, the combination with a supporting housing provided with a hollow operating arm, said arm and housing being rotatable about a common axis, and said arm being provided at its free end with a handle member rigidly affixed thereto; of a lamp carrying head having a lamp affixed thereto for movement in unison with said head, said head being rotatably supported by said housing for rotation about an axis at an angle to said axis first named; means connected with said handle member for rotating said lamp carrying head, and by means of which said handle member may be rotated; a lamp bulb within said head; an electric circuit leading to said bulb; a switch for said circuit, said switch being disposed within said housing adjacent said head and having means adapted to coact with said head to open and close said circuit; and means for operating said switch, said means including a reciprocating operating element extending from said switch through said operating arm to said handle member.

12. In a dirigible light, the combination with relatively fixed supporting means; of a shaft rotatably mounted on said means to turn about one axis; a light carrying member extending to one side of said shaft adjacent the outer end thereof, said light carrying member being mounted to rotate about an axis arranged at an angle to the axis of rotation of said shaft; means for effecting independent rotation of said shaft and member about their respective axes, said means including a hand gripping portion at the inner end of said shaft; an electric circuit; a switch at the outer end of said shaft, including an angular lever; and actuating means extending from said switch to the hand operating portion at the inner end of said shaft and operable to move said switch lever.

13. In a dirigible light for attachment to supports of varying cross section and contour, in combination: a lamp housing, an apertured support, a tubular member extending through the aperture of the support, means cooperating with said tubular member for moving said lamp housing on two axes, an inner bracket embracing said tubular member and bendable to conform to the configuration of the inner surface of said support, an outer two-part bracket, one of said parts being secured to the outer surface of said support, and the other of said parts supporting the lamp housing and being movably mounted on said first mentioned part for angular adjustment relative thereto, said movable part being apertured for the reception of the outer portion of said tubular member.

In witness that I claim the foregoing I have hereunto subscribed my name this 8th day of February, 1924.

CLIFFORD SKLAREK.